United States Patent

[11] 3,622,821

| [72] | Inventor | George E. Maffey, Jr. |
| | | Timonium, Md. |
| [21] | Appl. No. | 23,223 |
| [22] | Filed | Mar. 27, 1970 |
| [45] | Patented | Nov. 23, 1971 |
| [73] | Assignee | The Black and Decker Manufacturing Company |
| | | Towson, Md. |

[54] DOUBLE-INSULATED MOTOR ARMATURE
16 Claims, 7 Drawing Figs.

[52] U.S. Cl.................................................. 310/60,
310/43, 310/90
[51] Int. Cl..................................................... H02k 9/06
[50] Field of Search.......................................... 310/60, 62,
75 D, 51, 90, 43; 64/1, 4

[56] References Cited
UNITED STATES PATENTS

| 3,457,438 | 7/1969 | Badcock...................... | 310/50 |
| 3,456,743 | 7/1969 | Badcock...................... | 173/117 |
| 3,463,950 | 8/1969 | Schadlich.................... | 310/51 |

Primary Examiner—D. X. Sliney
Attorneys—Leonard Bloom, Joseph R. Slotnik and Edward D. Murphy ABSTRACT: An armature including laminations, coils and a commutator and an insulating coupling to an output drive member is disclosed. Juxtaposed flange members are provided on the shaft and on the drive member and a rigid insulating coupling member is provided in interlocking relationship with the flanges. Preferably, the coupling member also serves as the hub for the motor-cooling fan and, preferably, the fan and coupling member are integrally molded in place over the two flange members.

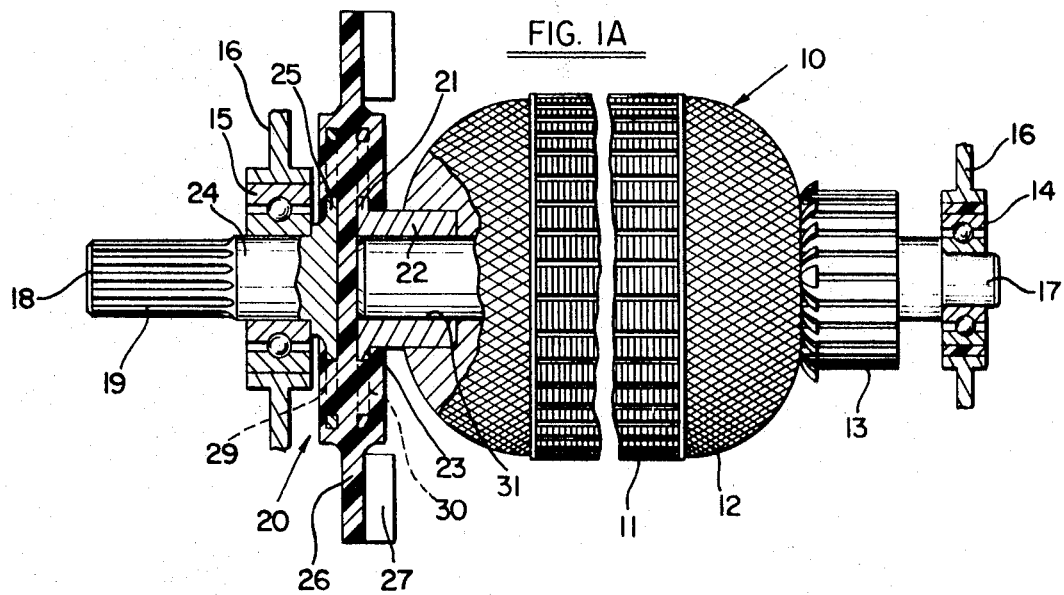
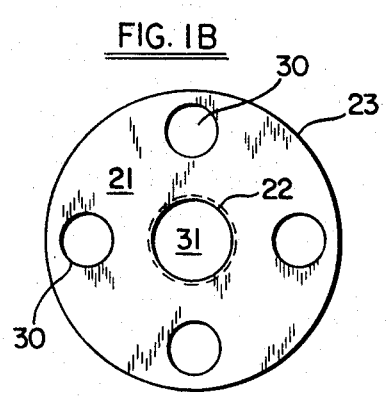
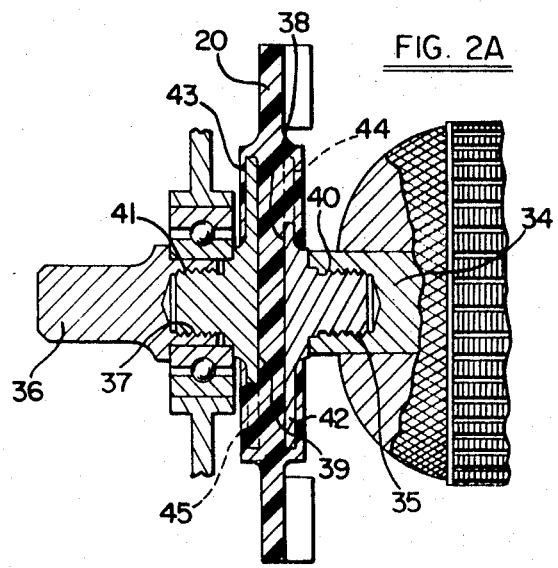
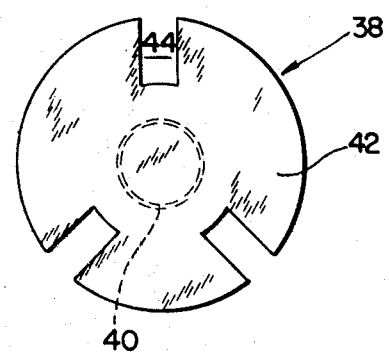

PATENTED NOV 23 1971 3,622,821
SHEET 2 OF 2
FIG. 3A
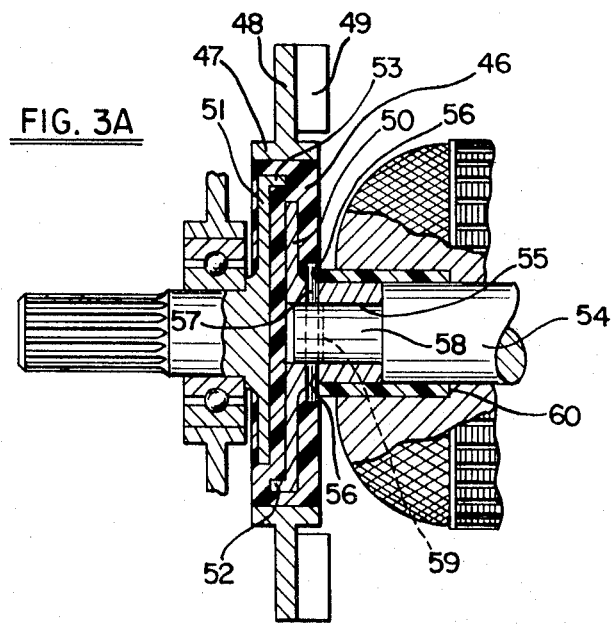
FIG. 3B
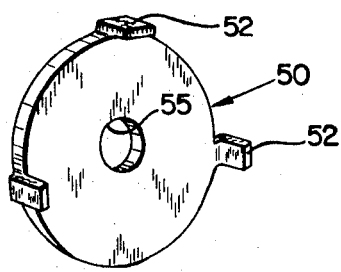
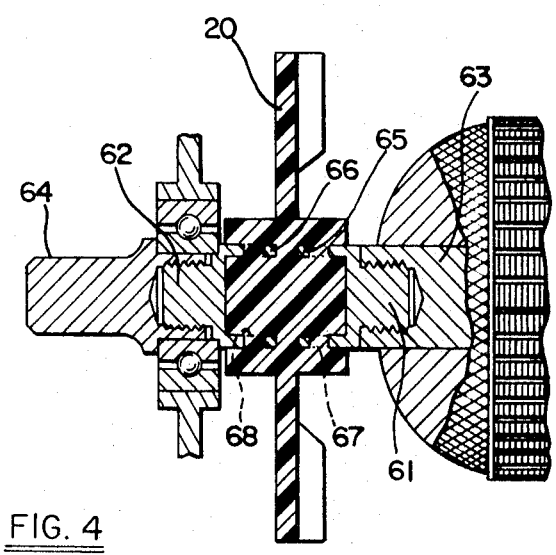
FIG. 4
INVENTOR
GEORGE E. MAFFEY, JR.
BY Edward D. Murphy
ATTORNEY

DOUBLE-INSULATED MOTOR ARMATURE

The present invention relates generally to electric motor devices, and particularly to an improved, insulated motor armature construction for electric tools.

In the field of electric motor-driven devices, it is necessary to provide an effective protection for the user against the possibility of breakdown or bypassing of electrical insulation within the motor. A specific area of this field is that of providing a second, protective barrier in addition to the functional insulation which must be included if the tool is to be useful. Then, if the functional insulation breaks down or is bypassed, the protective barrier remains to prevent the possibility of injury to the user.

The armature shaft of an electric motor is normally connected directly to an output element by means of which the tool produces useful work. Accordingly, in addition to the insulation on the wires which are wound on the armature, it is useful to provide a second barrier of insulation between the armature coils and the tool element of the device. The present invention is directed to an improved means of providing this insulation.

Accordingly, it is an object of this invention to provide new and improved means for insulating the output element of an electric tool from the motor.

Another object of this invention is the provision of an improved insulating barrier for electric motor armatures which does not reduce the power-to-size ratio of the armature.

Another object of the present invention is the provision of an improved armature construction which is suitable for use with armatures of various sizes and types.

It is also an object of the present invention to provide an improved armature construction which is adapted for mass production forming and assembling techniques.

Further objects and advantages of this invention will become apparent upon consideration of the following detailed description taken in conjunction with the appended drawings in which:

FIG. 1A is a view, partly in section, illustrating a universal electric motor armature embodying one form of the present invention;

FIG. 1B is an end view of an element of FIG. 1A;

FIG. 2A, is a cross-sectional view of a portion of an armature embodying an alternate form of the present invention;

FIG. 2B is an end view of an element of FIG. 2A;

FIG. 3A is a cross-sectional view of a still further embodiment of the present invention;

FIG. 3B is a perspective view of an element of FIG. 3A; and

FIG. 4 is a cross-sectional view of an alternative armature in accord with this invention.

Briefly, in accord with one embodiment, the present invention is concerned with an insulating element incorporated in the drive train between the motor and the output element. Specifically, the armature shaft is terminated in a flange member and an output pinion is juxtaposed therewith, the output pinion also having a flange. A plastic coupling member of high rigidity and strength is molded in place between and surrounding the flange portions of the shaft and the pinion so as to simultaneously insulate electrically and couple mechanically these elements. Preferably, extensions or apertures are provided extending from or located within the flanges to increase the torque-transmitting capability of the coupling. It is also preferred that the flange elements extend radially outward from the shaft and pinion so as to reduce the overall length of the unit. Finally, it is also preferred that the plastic coupling member form the hub for the cooling fan normally used in conjunction with a universal electric motor, the fan blades and backing plates being formed simultaneously with the coupling member.

In FIG. 1A, an electric motor armature embodying the present invention is shown generally at 10. The armature includes a stack of laminations 11 within which are located a plurality of armature coils 12. The coils 12 are connected in the conventional manner to a commutator 13 and voltage is applied thereto via brushes (not shown). The armature is supported for rotation within bearings 14 and 15 which are in turn supported by a motor frame 16. The frame 16 also holds a conventional field subassembly (not shown) so that the armature rotates when an appropriate voltage is applied thereto.

The armature includes a metal shaft 17 and a metal driving member such as a pinion 18 which may be provided with appropriate gear teeth 19 for engagement with an output gear which may form the first member of a gear reduction assembly or may drive a tool element directly. Of course, the driving member may itself be directly connected to a tool element in some cases.

As previously noted, it is desirable to provide a second barrier of insulation between the wires which form the armature coils and the driven tool element in order to provide supplemental protection against the possibility of injury. In the past, this has frequently been done by means of a sleeve positioned on the armature shaft; however, this occupies space within the armature coils and decreases the power which may be obtained from a given size armature. In other cases, insulated gears have been provided but these are expensive and furthermore cannot be used when the driving member is directly coupled to the tool element without gear reduction. Finally, some constructions have used insulating members built into the armature shaft but these occupy some length, thus increasing the overall length of the device; also, it is difficult to maintain alignment and to transmit torque through such members.

The embodiment of the present invention illustrated in FIG. 1A overcomes these difficulties and provides an improved insulated driving coupling between the armature shaft and the driving member by means of a rigid insulative coupling member 20 which is mounted therebetween and firmly engaged with both. Specifically, the armature shaft is provided with a metal end flange 21, shown more clearly in FIG. 1B, which includes a cylindrical portion 22 and a radially extending portion 23. The cylindrical portion 22 is tightly engaged with the armature shaft 17, as by press fitting, so that the connection is adequate to stand the strain produced by operation of the motor in a tool. The pinion 18 comprises a shaft portion 24 and a radially extending flange portion 25, the flange portion being juxtaposed with and spaced from the flange portion 23 of the member 21. The coupling member 20 is formed over the flange portions 23 and 25, as for example by molding in place and thus forms a rigid, insulating, torque-transmitting connection between the armature shaft and the output pinion. In accord with a preferred embodiment of this invention, the coupling member 20 is extended to form a backing plate 26 having axial extensions 27 thereon which constitute fan blades to produce a cooling flow of air through the motor. Thus, the arrangement shown provides for coupling the pinion to the armature shaft, provides the insulation barrier desired and simultaneously provides the fan member normally required in an electric motor. By appropriately shaping the mold in which the coupling member is formed, any appropriate fan blade configuration may of course be provided. It is also a feature of this construction that the integrally molded fan substantially increases the creep length over which conductive material would have to build up to short the pinion to the shaft.

The material of which the coupling is formed may be any suitable rigid plastic including, for example, glass-filled polyester resin, nylon or polycarbonate. Other plastics, e either filled or unfilled, may be used provided that the thickness between metallic elements is sufficient in relation to the dielectric strength and provided that the rigidity and strength are sufficient to transmit the motor torque directly to the output member without flexing.

To increase the torque-transmitting capability of this construction, the flanged portions 25 and 23 may be provided with apertures 29 and 30 as are shown more clearly in the FIG. 1B illustration of the flange member 21. When the coupling member 20 is molded over the flange portions, the molding material fills these apertures and thus the sides thereof and the provision of integral rigid plastic therein provide increased torque capability. It is noted that the provision of molded material behind the flange portions as shown is not required since adequate torque is transmitted via these surfaces.

The construction illustrated in FIG. 1A also provides an additional feature of this invention in that, during the molding operation, the pinion 18 and the flange member 21 may be located in the mold and the injection tube may be provided within the opening 31 where the armature shaft 17 will later be located. With this arrangement, when the liquid material is injected into the mold, the force of the material impinging against the face of the pinion 18 and the reflection thereof against the face of the flange member 21 serve to maintain the desired separation therebetween without requiring this separation to be maintained by the fixturing equipment.

FIGS. 2A and 2B illustrate an alternative embodiment of this invention wherein an armature shaft 34 is terminated with an internally threaded bore 35. A pinion or other drive member 36 is also provided with an internally threaded bore 37 and a pair of similar flange members 38 and 39 are provided with externally threaded portions 40 and 41 which are adapted to be screwed into the internal bores in the shaft and the pinion. The coupling member 20 is again formed to include the radially extending flanges 42 and 43 of members 38 and 39, this preferably being done by molding in place. In this case, the torque-transmitting surfaces may comprise notches 44 and 45 cut into the outer circumference of the flanges, as illustrated in FIG. 2B. It is noted that this embodiment permits separate manufacture of the armature and coupling which are subsequently joined via the threaded members.

As in the previous embodiment, the fan in FIG. 2A is molded integrally with the coupling member 20 in the preferred form of this invention although, in either case, a separate fan member could be pressed over the coupling member or, if desired, the fan could be provided at a completely separate location. As previously noted, locating the fan at the coupling member enables this member to provide the two functions of insulation and supporting the fan simultaneously while molding the fan integrally therewith eliminates the need for making and assembling a separate part.

FIG. 3A illustrates the provision of a coupling member 46 which functions as a hub for a separate fan. The fan may include a ring portion 47 for engaging the coupling 46, a backing plate 48 and a set of blades 49, formed in any suitable manner. This fan is added, e.g. by pressing on the hub, after the coupling subassembly is completed.

In FIGS. 3A and 3B, a further embodiment of this invention is also illustrated wherein the flange members 50 and 51 include axially extending lugs 52 and 53 which provide additional torque-transmitting surfaces engaged by the encompassing plastic material. A further advantage of the illustrated construction lies in the arrangement for connecting the coupling assembly to the armature shaft. Specifically, the flange member 50 for the shaft 54 is provided with an internal bore 55 and diametrically opposed holes 56 are provided at a location which will lie under the molded material. A driving pin 57 is inserted through these holes, the two flange members 50 and 51 are fixtured and the coupling member 46 is molded in place so as to engage the flanges and lock the pin in place. The armature shaft 54 is formed with a reduced diameter portion 58 adjacent its end and a slot 59 is provided into the shaft from the end. The diameter of the portion 58 corresponds to the internal diameter of the bore 55 and the slot width corresponds to that of the pin 57. The armature is separately wound and other operations thereon are performed. Then, the armature is simply inserted into the end of the flange member in such a manner that the slot engages the driving pin. Thus, this construction also enables one to obtain the advantage of separate manufacture of the respective subassemblies followed by simple coupling of these subassemblies. In addition, the embodiment of FIG. 3A is suitable for use in a reversible tool since torque in either rotational direction can be transmitted through the coupling.

This embodiment also illustrates an additional feature which may be used, if desired, in conjunction with this or other embodiments of the present invention. Specifically, an insulating sleeve 60 may be provided over the armature shaft to prevent the possibility of breaking the insulation of the end turns and causing the shaft to become live during winding of the armature. As illustrated, the sleeve fits relatively tightly over the large diameter portion of the armature shaft and provides a space for the later insertion of the flange member at the region of reduced armature shaft diameter.

FIG. 4 discloses a further embodiment of this invention wherein a pair of similar flanges members 61 and 62 are provided for the shaft 63 and the output member 64. In this case, the flange portions 65 and 66 of the members 61 and 62 extend axially and are provided with radial apertures 67 and 68 to provide the additional torque-transmitting surfaces. This construction may be of use where the overall diameter of either the fan hub or of the fan is to be reduced and where a slight increase in axial length of the system can be accepted.

It will be clear from the foregoing description that the present invention provides an improved insulating coupling for electric motor armatures which, in its various embodiments, provides several advantages. In addition to those previously noted, a specific feature of this invention is the provision of a rigid insulating coupling member which maintains the axial alignment of the armature shaft and the output member. This enables the single bearing for the driving member to support both this member and the armature shaft, thus avoiding the need for providing an additional, insulated bearing on the armature shaft. Furthermore, the provision of radial or axial flanges on a driving member and on the shaft over which the coupling member is molded serves to increase the rigidity of the structure and increase its resistance to flexing stresses.

Accordingly, while several specific embodiments of this invention have been shown and described, it will be apparent to those skilled in the art that many changes and modifications may be made without departing from the broader aspects of this invention. It is therefore intended that the appended claims cover all such changes and modifications as fall within the true spirit and scope of this invention.

I claim:

1. In an electric motor including an armature having a shaft, said armature being arranged for rotation upon the application of a voltage thereto, and means insulatively coupled to said shaft for driving an output device, the improvement comprising first flange means extending from one end of said shaft;

second flange means extending from one end of said driving means and juxtaposed with said first flange means;

a rigid, insulating, coupling member extending between and engaging said flanges to provide for transmission of driving torque from said shaft to said driving means; and a fan for producing a flow of cooling air over said armature, said fan comprising an integral extension of said coupling member.

2. In an electric motor including an armature having a shaft, said armature being arranged are molded rotation upon the application of a voltage thereto, and means insulatively coupled to said shaft for driving an output device, the improvement comprising a rigid, insulating coupling member extending between and engaging said shaft and said driving means to provide for torque transmission therebetween; and a fan member for producing an air flow, said fan member being an integral extension of said coupling member whereby said coupling member is the hub of said fan member.

3. Apparatus as claimed in claim 1 wherein said fan and said coupling member are molded in situ over said flange means.

4. Apparatus as claimed in claim 1 wherein said flange means extend in a radial direction from said shaft and from said driving member.

5. Apparatus as claimed in claim 4 wherein said flange means include surfaces arranged to transmit torque from said shaft to said driving means; and said coupling member is disposed in engagement with said surfaces.

6. Apparatus as claimed in claim 5 wherein said surfaces are defined by openings extending through said flange means.

7. Apparatus as claimed in claim 5 wherein said surfaces are defined by lugs extending from said flange means.

8. Apparatus as claimed in claim 7 wherein said lugs extend radially from said flange means.

9. Apparatus as claimed in claim 7 wherein said lugs extend axially from said flange means.

10. Apparatus as claimed in claim 1 wherein said flange means extend in an axial direction from said shaft and from said driving member.

11. Apparatus as claimed in claim 10 wherein said flange means include surfaces arranged to transmit torque from said shaft to said driving means; and said coupling member is disposed in engagement with said surfaces.

12. Apparatus as claimed in claim 1 wherein said first flange means comprises a cylindrical portion and a flange portion; said cylindrical portion being fitted tightly to said shaft.

13. Apparatus as claimed in claim 1 wherein said first flange means comprises an axially extending threaded portion adapted for engagement with said shaft.

14. Apparatus as claimed in claim 1 wherein said second flange means is an integral part of said driving means.

15. Apparatus as claimed in claim 1 wherein said second flange means comprises a member fixedly secured to said driving means.

16. Apparatus as claimed in claim 1 wherein a bearing is provided for said driving means, said bearing being located adjacent said coupling member to support said armature, said bearing being insulated from said armature shaft by said coupling member.

* * * * *

UNITED STATES PATENT OFFICE
CERTIFICATE OF CORRECTION

Patent No. 3,622,821   Dated November 23, 1971

Inventor(s) George E. Maffey, Jr.

It is certified that error appears in the above-identified patent and that said Letters Patent are hereby corrected as shown below:

At column 2, line 62, after "plastics," the letter --- e --- should be omitted. At column 4, line 60, the phrase "arranged are molded rotation" should read --- arranged for rotation ---.

Signed and sealed this 13th day of June 1972.

(SEAL)
Attest:

EDWARD M. FLETCHER, JR.
Attesting Officer

ROBERT GOTTSCHALK
Commissioner of Patents